Figure 1:
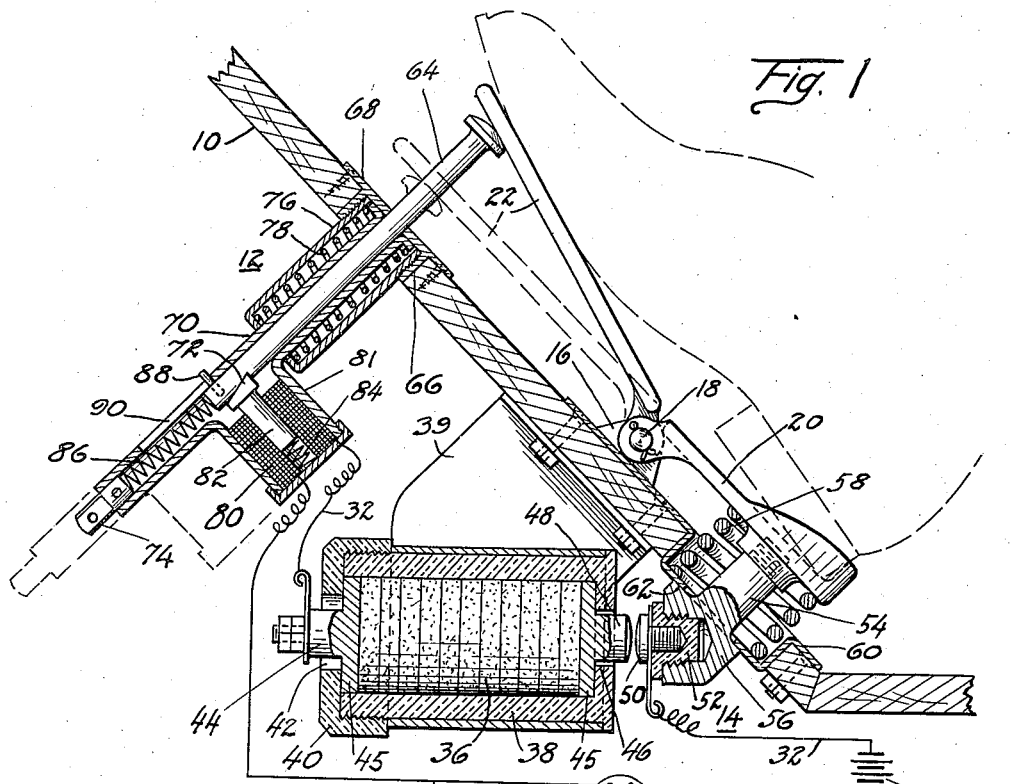

June 15, 1937.   R. J. BURTON ET AL   2,083,940
VEHICLE CONTROL DEVICE
Filed Sept. 30, 1933

INVENTORS
Ralph J. Burton and
Ralzemond B. Parker
BY
ATTORNEYS.

Patented June 15, 1937

2,083,940

UNITED STATES PATENT OFFICE 2,083,940

VEHICLE CONTROL DEVICE

Ralph J. Burton and Ralzemond B. Parker, Detroit, Mich., assignors to Bendix Brake Company, South Bend, Ind., a corporation of Illinois Application September 30, 1933, Serial No. 691,650

8 Claims. (Cl. 192—3)

This invention relates to a vehicle control mechanism, and has particular reference to unitary control means for regulating the acceleration and retardation of the vehicle.

More particularly, it is one of the major objects of this invention to provide an improved control device responsive to the foot of the operator to control both the acceleration and retardation of the vehicle.

Another object is to provide power brake control mechanism adjacent to the accelerator mechanism in order that a unitary device, such as a pedal, may be employed to actuate either the accelerator or the brake with a minimum amount of effort and movement on the part of the operator. The pedal is so supported that upon depressing one end of the pedal the accelerator mechanism is actuated, and upon exerting pressure on the other end of the pedal the power control mechanism is actuated.

Another object of importance is to provide a pedal device which is yieldable to foot pressures exerted at one end thereof to control the speed of the vehicle and which is responsive but substantially unyieldable to foot pressures exerted on the other end thereof to vary the brake application. A meritorious feature is that the brake control mechanism is responsive to variations in pressure accompanied by only a minimum of movement to cause brake pressures up to the maximum to be developed.

Another object is to provide a power brake control device which indicates to the operator by its reaction to manual pressure the proportionate amount of force with which the brakes are applied.

Another object is to increase the safety of the driver and the certainty of stopping the vehicle at those times of emergency brake application when the driver may become confused and distribute his foot pressure over the whole pedal.

A further object is to provide a heel-and-toe pedal device which is sensitive to both the heel and toe pressures exerted thereon to vary respectively the speed of the motor and the braking of the vehicle, and to provide a device for automatically rendering the speed controller inoperative upon brake application.

In attaining the above objects it is our particular aim to permit such accomplishment without requiring the operator to make undue exertions and awkward rocking motions of his foot to either accelerate the vehicle or apply the brakes.

Figure 2:
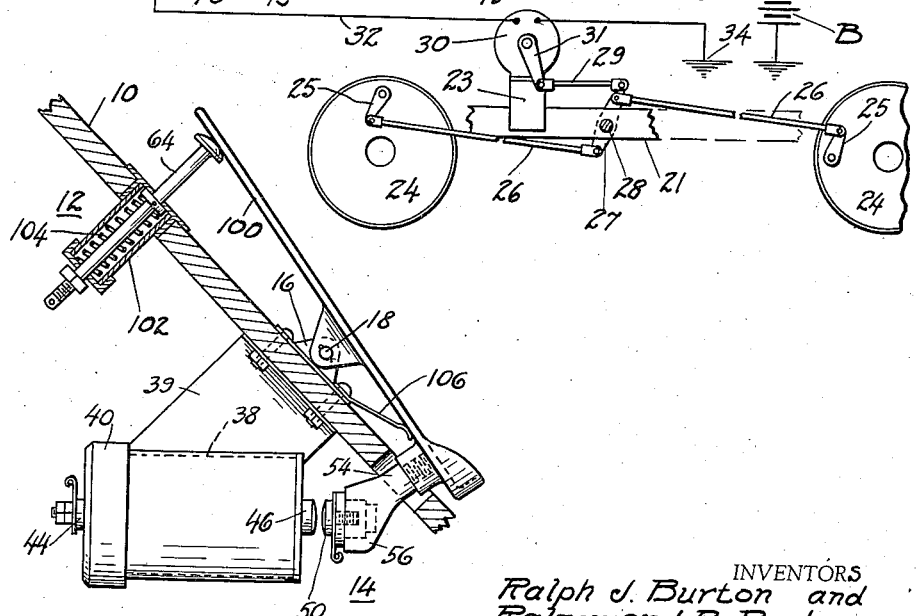

Other meritorious features of our invention will appear from the following description taken in conjunction with the drawing wherein like numerals refer to like parts throughout the several figures, and wherein:

Figure 1 is a side elevation, partly in section, of the combined pedal device for accelerating the motor and retarding the vehicle and illustrating the manner of automatically rendering the accelerator inoperative during brake application, and includes on a smaller scale a side elevation of the wheels and chassis frame of an automotive vehicle, and Figure 2 is a somewhat modified form of structure.

Since the advent of the automobile it has been customary to control the speed of the engine and the retardation of the automobile by entirely separate levers or pedals. Such operation has always required the vehicle operator to shift his foot and leg a considerable distance laterally. In instances where quick stopping is required, it is apparent that not only is there a waste of time in moving the foot from one pedal to another but also there is the danger of missing the second pedal. If some means could be provided for eliminating the necessity of shifting the foot from one area to another in order to apply the brakes an extremely advantageous brake operation would occur. This is particularly true in view of the relatively high speeds at which automobiles now travel over the road. This invention obtains the above desired operation by providing a combination pedal with means for actuating the accelerator of the vehicle by pressure from one part of the foot and means for controlling the brake application by a simple transfer of pressure to another part of the foot.

It is one of the major purposes of this invention to increase the comfort of the operator and sureness of operation of this double acting pedal device. The human foot is capable of only a slight rockable movement and to have its rocking movement operate both the accelerator and brake control members places a considerable hardship on the operator as well as producing fatigue. The pedal and the associated control devices have been devised to enable the operator to use all the rocking motion of his foot to actuate the accelerator in a manner similar to the prevailing accelerator pedals. Cooperating with this pedal there is a brake control device which enables the operator to control the application of the brakes by exerting foot pressure in a certain direction upon the pedal requiring only a minimum of movement of the foot. A control device which is sensitive to pressures exerted thereon but is substantially unyieldable thereto has been utilized to control the brake application. As a result the brakes are applied with a force which is directly in proportion to the pressure exerted by the operator's foot.

Figure 1 illustrates one method of accomplishing the results hithertofore mentioned. The numeral 10 represents the slanting floorboard of the conventional automobile. Toward the upper end of this floorboard an accelerator mechanism represented generally by numeral 12 is positioned. Toward the bottom of the floorboard and vertically displaced from the accelerator mechanism is a vehicle brake control mechanism illustrated generally as 14. Intermediate these two mechanisms there is a support member 16 fixed to the floorboard and carrying a pivot pin 18. Pivotally secured to this pin are two members 20 and 22 which are adapted to support respectively the heel and toe portions of the operator's shoe shown in dotted lines. It is thus apparent that upon exerting toe pressure the member 22 will be depressed, and upon exerting heel pressure the member 20 will tend to pivot about the pin.

The chassis frame 21 of a motor vehicle supports by bracket 23 a power operated device 30, which in this particular embodiment is an electrical half-turn motor. Numerals 24 represent the motor vehicle wheels which carry the chassis frame 21. Interiorly expanding brakes (not shown) are located within the wheels 24 and are operated by a linkage 25 and 26 connected with the power operated device through lever 27 which is rotatably mounted on shaft 28 and connected with the motor 30 through linkage 29 and 31. This showing is a diagrammatic miniature illustration indicating one manner in which connection may be made with the brakes. The electrical motor is included in an electrical circuit 32 grounded at 34 and extending in the other direction through a solenoid 80 to be hereinafter described. The electrical circuit 32 includes the brake control mechanism 14 and extends to the battery B and thence is grounded.

The brake control mechanism 14 comprises a carbon pile resistor 36 including a plurality of carbon discs, mounted in an insulative cylindrical casing 38 secured rigidly to the floorboard by the support 39 and provided at one end with a screw cap 40 for permitting the replacement or removal of the carbon discs. The cap 40 has an aperture 42 through which extends a terminal 44 connecting with the circuit 32. Likewise the casing 38 has an aperture 46 through which extends the contact button 48. Both the contact button 48 and the terminal 44 have face plates 45 which seat within the casing 38 against the carbon discs. Opposite the button 48 is a second contact button 50 insulatively mounted in member 52. The button 50 is connected with a lead 32 from the battery B in any desired way.

Normally, as shown in the drawing, the contact buttons are separated from one another. Actuating mechanism for bringing these contacts together comprises a shaft 54 extending from the base portion of the heel rest 20 to a head member 56 which supports the insulative member 52 and button 50. A spring 58 of sufficient tensile strength to sustain the normal resting weight of the operator's heel resiliently holds the heel rest 20 away from the floorboard and maintains the contacts separated as shown.

This spring is seated within cup-shaped metal support 60 positioned in an aperture in the floorboard. The spring resiliently holds the shoulders 62 of the head 56 against the base of the cup-shaped support. It is readily apparent that if pressure greater than the normal resting weight of the heel is exerted on the member 20, the springs will yield and electrical contact will be made between the buttons.

The accelerator mechanism 12 includes a reciprocating rod 64 extending through the aperture 66 in the floorboard. A supporting plate 68 secured to the floorboard substantially covers the aperture except for a hole through which the rod 64 may reciprocate. The rod 64 extends through a sleeve 70 and the two are normally locked together by wedge shaped member 72, to be more fully described later, for reciprocating movement together. Movement of the sleeve is transmitted through connection 74 to the throttle of the internal combustion engine (not shown) for regulating its speed. A housing 76 extending axially of the sleeve and secured to the supporting plate 68 seats a spring 78 for resiliently urging the sleeve and normally the rod to their elevated position.

An electro-magnetic means is illustrated for withdrawing the wedge shaped locking member 72 to an unlocked position. A housing 81, integral with the sleeve 70, carries in its interior a solenoid 80. Within the solenoid a portion 82 of the locking member 72 acts as an armature and is slidable within the solenoid. A spring 84 resiliently urges the armature 82 and the wedge locking member 72 into locking engagement with a wedge-shaped groove on the rod 64.

The sleeve 70 is hollow for a considerable extent beyond the normal position of the rod 64 in order that the latter can reciprocate with respect to the former when the locking member 72 is withdrawn. A light spring 86 in this hollow portion of the sleeve urges the rod to its raised position. A pin 88 extending laterally from the rod is adapted to slide in a slot 90 in the sleeve, the upper end of the slot determining the maximum elevation of the rod 64. The slot and pin also perform the function of preventing the rod from rotating with respect to the sleeve and thereby prevent the wedge-shaped groove from misaligning itself with respect to the co-operating locking member 72.

Upon energization of the solenoid at any position of the sleeve, the locking member 72 is withdrawn to unlocked position and spring 78 will return the sleeve to its normal idling position against the plate 68 and as a result the speed of the engine will be decreased. When the rod and sleeve are unlocked, the reciprocation of the rod will have absolutely no effect on the sleeve and as a consequence will not increase the speed of the engine.

In the modification shown in Figure 2 there is shown the use of a single treadle plate 100 for the foot rest rather than a split one illustrated in Figure 1.

The essential principle involved in Figure 1, that of providing a pedal which permits the rocking motion of the foot to actuate the accelerator, and providing a heel rest which is substantially rigid but which is sensitive to various heel pressures exerted thereon to apply the brakes with a proportionate force forms the basis of the construction of Figure 2.

In Figure 2 a simple housing structure 102 contains a spring 104 for resiliently urging the accelerator rod 64 to its raised position. Also, in place of the spring 58 a lighter spring 106 has been provided, since during the acceleration of the vehicle by the operator's foot the heel portion of the pedal 100 will be raised away from the floor boards. The spring 106 prevents the buttons from contacting when the driver's foot is entirely removed from the pedal.

In the operation of the pedal device in Figure 1 the operator has merely to exert toe pressure or heel pressure to respectively accelerate or retard his vehicle. If the operator desires to retard the speed of the vehicle, he exerts a gouging heel pressure on the pedal device. The carbon pile resistor 36 although extremely sensitive to pressure is substantially unyieldable thereto and hardly any appreciable movement is felt by the operator after the buttons are contacted. The more the carbon pile is compressed, the greater will be the amount of current therethrough, and as a result the greater will be the force with which the brakes are applied by the electrical power operated device. Therefore it is seen that the amount of heel pressure exerted by the operator is a true measure of the force with which the brakes are applied.

During the application of the brakes, it is apparent that since the solenoid 80 forms part of the power circuit it will become energized upon brake application of the pedal and withdraw the locking member 72. If the operator should become confused and exert pressure with both heel and toe, the accelerator rod will slide within the sleeve 74 and will not increase the speed of the engine. If at any time the accelerator mechanism is depressed and it is necessary to apply the brakes, a heel pressure exerted on rest 20 will automatically result in the unlocking of the accelerator rod and sleeve, and the stronger spring 78 will raise the sleeve to its idling position slowing down the engine. Upon decreasing the toe pressure, the spring 86 will raise the rod back to its normal position with the wedge-shaped groove opposite the locking member 72. Upon release of heel pressure the compression of the carbon discs is relieved and the circuit is broken at button 50. The opening of the circuit 32 de-energizes the solenoid allowing spring 84 to force the locking member 72 into locking engagement with the rod 64 and the sleeve and rod are ready to be reciprocated together again to vary the speed of the engine.

The operation of the modification in Figure 2 is readily apparent. In order to apply the brakes one merely has to exert a heel pressure which is substantially resisted by the power control device thereby enabling the operator to utilize all the rocking movement of his foot to actuate the accelerator.

From the foregoing description it is apparent that the combination accelerator and brake control pedal described increases the safety and comfort of the operator of a motor vehicle. The embodiment shown and described herein is susceptible of many modifications, and it is within the spirit of this invention to associate with the accelerator control other brake control devices in place of the one disclosed in the embodiment herein which are only slightly movable to control the extent of brake application. These various modifications of this invention will be apparent to those skilled in the art and we, therefore, intend to limit ourselves only within the scope of the appended claims.

What we claim:

1. In an automotive vehicle, brakes, power means for applying the brakes, a power varying mechanism for varying the power brake application, an accelerator mechanism adjacent said mechanism and including a pair of telescoping members normally locked together to operate as a unit, a combination accelerator and brake pedal supported intermediate said mechanisms and adapted upon pressures being exerted on either end thereof to actuate either of said mechanisms, and means associated with said power means for automatically unlocking said telescoping members and rendering said accelerator mechanism inoperative upon actuation of said power varying mechanism.

2. A motor vehicle having brakes, a pedal device having separate heel and toe portions each mounted to yield independently of the other, power mechanism to actuate the brakes, a power brake controller operably associated with the heel portion of said pedal device, a variable motor control operatively associated with the toe portion of said pedal device, said motor controller having two members normally locked together as a unit so as to render the controller operative, and power means associated with said power brake controller operative upon actuation of the latter to unlock said members and render the actuation of the toe portion of the pedal device inoperative.

3. A motor vehicle having brakes, a pedal device having separate heel and toe portions each operative independently of the other, power means for applying the brakes, control means for said power means operatively associated with the heel portion of said pedal device, a variable motor control operatively associated with the toe portion of said pedal device, said motor control including two telescoping members normally locked together in extended position so as to transmit motor control movements thereby, and power mechanism operatively related to said power brake means adapted to unlock said telescoping members upon brake application of said power means and render the motor control inoperative regardless of the position of the toe portion of the pedal device.

4. A motor vehicle having brakes, power mechanism for applying the brakes, control means for varying the brake application of said power mechanism, motor control means, means responsive to foot pressure of the operator for actuating said power brake control means, means responsive to foot pressure of the operator for actuating said motor control means, said motor control means including two members normally locked together so as to transmit movements to control the operation of the motor, and means operatively associated with said power mechanism operable to unlock said members upon brake application so as to render said motor control inoperative regardless of the position of the motor control means at the time of brake application.

5. In a motor vehicle having an accelerator and brakes including mechanism for applying the brakes, accelerator control mechanism including two aligned linkages normally locked together to transmit reciprocating control movements, and means operatively related to said brake applying mechanism adapted upon application thereof to unlock said linkages at any position of their movement so as to render the accelerator control mechanism inoperative.

6. In a motor vehicle, a combination accelerator and brake control pedal split intermediate its ends so that the toe and heel portions are operable independently of each other, a power brake controller operably connected to the heel portion of the pedal and sensitive to heel pressure exerted thereon to vary the brake application in proportion thereto, a motor controller operably connected to the toe portion of the pedal and sensitive to toe pressures exerted thereon to vary the acceleration of the vehicle, said motor controller having two telescoping members normally locked together in extended condition to transmit reciprocating motor control movements thereby, and means operatively related to the power brake controller for unlocking said telescoping members upon actuation of the controller so that upon pressure being exerted simultaneously upon both the heel and toe portions of the pedal the motor controller is rendered inoperative regardless of the position of the same.

7. In a motor vehicle, a pedal control device for controlling the acceleration and retardation thereof comprising, in combination, a pedal having a heel and toe portion for receiving an operator's foot, said pedal being split intermediate its ends forming separate heel and toe portions each mounted for pivotal movement independent of the other, an accelerator control operatively connected to said toe portion of the pedal and responsive to toe pressure exerted by the operator to yield and vary the acceleration of the motor vehicle in accordance therewith, power brake mechanism for retarding the speed of the vehicle, a brake control device for said power mechanism operatively connected to said heel portion of the pedal and being responsive to the heel pressure exerted by the operator to vary the brake application of said power mechanism in proportion to the pressure of the heel, said brake control device being substantially unyieldable to the pressure of the heel as it controls the brake application in accordance therewith, and means responsive to brake application for rendering said accelerator control device ineffective irrespective of what position the toe portion may have assumed in controlling the acceleration of the vehicle.

8. In a motor vehicle, brakes, power means for applying the brakes, a brake control device for controlling said power means, an accelerator control device including mechanism for transmitting movements to control the motor of the vehicle, said accelerator and brake control devices each having an independently operable member responsive to foot pressures of the operator for controlling the same, and means responsive to power brake application for disconnecting said accelerator mechanism and rendering said accelerator control device ineffective irrespective of what position it may have assumed or whether both members are acted upon at the same time by the operator.

RALPH J. BURTON.
RALZEMOND B. PARKER.